(12) United States Patent
Clark

(10) Patent No.: US 11,712,324 B2
(45) Date of Patent: Aug. 1, 2023

(54) DENTAL SEPARATOR DEVICE

(71) Applicant: David J. Clark, Tacoma, WA (US)

(72) Inventor: David J. Clark, Tacoma, WA (US)

( * ) Notice: Subject to any disclaimer, the term of this patent is extended or adjusted under 35 U.S.C. 154(b) by 455 days.

(21) Appl. No.: 15/573,521

(22) PCT Filed: May 12, 2016

(86) PCT No.: PCT/US2016/032178
§ 371 (c)(1),
(2) Date: Nov. 13, 2017

(87) PCT Pub. No.: WO2016/183360
PCT Pub. Date: Nov. 17, 2016

(65) Prior Publication Data
US 2018/0200026 A1    Jul. 19, 2018

Related U.S. Application Data

(60) Provisional application No. 62/160,471, filed on May 12, 2015.

(51) Int. Cl.
*A61C 5/85* (2017.01)
*A61C 5/80* (2017.01)

(52) U.S. Cl.
CPC . *A61C 5/85* (2017.02); *A61C 5/80* (2017.02)

(58) Field of Classification Search
CPC .................................... A61C 5/80; A61C 5/85
See application file for complete search history.

(56) References Cited

U.S. PATENT DOCUMENTS

| | | | |
|---|---|---|---|
| 4,007,530 A * | 2/1977 | Gaccione | A61C 5/82 433/139 |
| 5,607,302 A | 3/1997 | Garrison | |
| 6,206,697 B1 | 3/2001 | Hugo | |
| 6,325,625 B1 | 12/2001 | Meyer | |
| 7,284,983 B2 | 10/2007 | McDonald | |
| 7,648,361 B2 * | 1/2010 | Kilcher | A61C 5/82 433/139 |
| D822,213 S * | 7/2018 | Hull | D24/181 |

(Continued)

OTHER PUBLICATIONS

International Search Report and Written Opinion for PCT/US2016/032178, dated Aug. 11, 2016, 12 pages.

*Primary Examiner* — Nicholas D Lucchesi
*Assistant Examiner* — Hao D Mai
(74) *Attorney, Agent, or Firm* — Quarles & Brady LLP

(57) ABSTRACT

A dental separator device includes an elastic body having a first end and a second end. A first surface engager is connected to the first end of the body. The first surface engager includes a first distal section and a first mesial section and a notch between the first distal section and the first mesial section. The first distal section and the first mesial section each include a pair of spaced apart hands. A second surface engager is connected to the second end of the body. The second surface engager includes a second distal section and a second mesial section, and a notch between the second distal section and the second mesial section. The second distal section and the second mesial section each include a pair of spaced apart hands. The hands are for engaging teeth and/or for creating adaptation pressure on a dental matrix stabilizer and/or dental matrix.

14 Claims, 3 Drawing Sheets

(56) References Cited

U.S. PATENT DOCUMENTS

| | | | |
|---|---|---|---|
| 2002/0061492 A1* | 5/2002 | Garrison | A61C 5/82 |
| | | | 433/139 |
| 2003/0059741 A1 | 3/2003 | Bills | |
| 2005/0118554 A1 | 6/2005 | Kilcher | |
| 2005/0147941 A1 | 7/2005 | McDonald | |
| 2007/0172793 A1 | 7/2007 | Doenges | |
| 2008/0064003 A1 | 3/2008 | Clark | |
| 2008/0064009 A1 | 3/2008 | Clark | |
| 2008/0064012 A1 | 3/2008 | Clark | |
| 2009/0208901 A1 | 8/2009 | Doenges | |
| 2013/0252199 A1 | 9/2013 | Clark | |
| 2013/0344455 A1* | 12/2013 | Hull | A61C 19/003 |
| | | | 433/29 |

* cited by examiner

DENTAL SEPARATOR DEVICE

CROSS-REFERENCE TO RELATED APPLICATIONS

This application represents the national stage entry of International Application PCT/US2016/032178 filed May 12, 2016, which claims benefit of U.S. Provisional Application 62/160,471 filed May 12, 2015, all of which is incorporated herein in its entirety by reference.

STATEMENT REGARDING FEDERALLY SPONSORED RESEARCH

Not Applicable.

BACKGROUND OF THE INVENTION

1. Field of the Invention

The present invention relates to a dental separator device that may be used in methods for the restoration of a decayed portion of a tooth.

2. Description of the Related Art

Dental cavities that have spread to the dentin or have undergone cavitation are typically treated by removing the decayed portion of the tooth and thereafter filling the missing tooth structure with a restorative material such as silver (amalgam), white (polymeric resin), porcelain, or gold. Cavities that are located adjacent to neighboring teeth are called interproximal cavities.

When treating interproximal cavities, the dentist first removes the decayed portion of the side of the tooth. In order to properly deposit the restorative material on the side of the tooth without undesired leaking of the restorative material beyond the side of the tooth, the dentist places a dental matrix around at least a portion of the tooth. The dental matrix may be a metallic or plastic strip, and when the matrix is placed around at least a portion of the tooth, the matrix acts as a form for the desired shape of the restored tooth. Various dental matrices and methods are shown in U.S. Patent Application Publication Nos. 2008/0064012 and 2008/0064003. (These patents and all other patents and publications cited herein are incorporated herein by reference.)

A dental separator ring may also be used when filling interproximal cavities. The separator ring applies pressure against the adjacent teeth to force the adjacent teeth apart to allow a dental matrix to be positioned between the adjacent teeth. The dental separator ring may also include specially configured ends that also function as a matrix stabilizer that maintains the matrix and any other matrix stabilizer in a desired position with respect to the tooth to be restored. Example dental separator rings can be found in U.S. Pat. Nos. 7,284,983, 6,325,625, 6,206,697 and 5,607,302 and U.S. Patent Application Publication Nos. 2008/0064009, 2007/0172793 and 2005/0147941.

The device of U.S. Pat. No. 7,284,983 has disadvantages. For example, the wedge shaped engager can make a flat spot when more of the tooth is missing. Another concern is that the angle of pressure may be less separating mesial-distal (front-back) and more buccal-lingual which will not spread the teeth as much.

The device of U.S. Pat. No. 5,607,302 also has disadvantages. For example, the sharp point on the mid-interproximal runs into the dental matrix and can make a flat spot. Also, the device focuses pressure in the middle between occlusal and gingival. Additionally, the pointed and arcing area in general encroaches in the interproximal area and will not allow the dental matrix to expand fully from buccal to lingual so as to reach out and create a solid contact on a tough contact or diastema case. Thus, the device does not allow the whole matrix to arc out. The resultant marginal ridge/contact area can be unhygienic. It will also be prone to fracture because it is too narrow from buccal to lingual, first because of the reduction in total volume of composite filling material, and secondly because the protection (buttressing) of the neighboring marginal ridge is not fully utilized. Also, the shape of the device can smash a traditional wedge.

Therefore, although various dental separator rings are available, there is still a need for an improved dental separator ring that may be used in the restoration of a decayed portion of a tooth.

SUMMARY OF THE INVENTION

The dental separator device of the invention can be used in a method for the restoration of a tooth having an original shape including a top surface and an interproximal surface. In the method, a portion of the top surface of the tooth and a portion of the interproximal surface of the tooth are removed using conventional dental instruments to form a hollow cavity preparation that extends from the top surface to the interproximal surface of the tooth. The hollow cavity preparation is preferably saucer shaped wherein the cavity preparation does not extend inward more than two millimeters from the interproximal surface of the tooth. The removed portion of the interproximal surface of the tooth is then surrounded with a sectional translucent (preferably transparent) anatomic dental matrix. An interproximal matrix stabilizer may also be used to hold the dental matrix against the tooth. See, for example, U.S. Pat. No. 9,308,058.

The invention provides an improved dental separator device that can be used in this type of restoration method. The dental separator device can separate teeth and/or create adaptation pressure on an interproximal dental matrix stabilizer and/or a dental matrix. In one form, the separator device terminates in eight independent hands. The hands are dimensioned to separate teeth and/or create adaptation pressure on an interproximal dental matrix stabilizer and/or a dental matrix.

In one non-limiting example form, there are four pairs of independently flexing hands. Each pair includes a notch or material weakness between the two sections of the pair of hands. Each notch or material weakness allows the hands to adapt to a variety of tooth shapes and tooth alignments.

In one aspect, the invention provides a separator device for separating teeth and/or for creating adaptation pressure on an interproximal dental matrix stabilizer and/or a dental matrix. The separator device comprises: an elastic body having a first end and an opposed second end spaced from the first end; a first surface engager connected to the first end of the body; and a second surface engager connected to the second end of the body. The first surface engager includes a first distal section and a first mesial section, and the first surface engager includes a notch or material weakness between the first distal section and the first mesial section. The first distal section includes a first portion, a second portion, and a notch or material weakness between the first portion and the second portion. The second surface engager includes a second distal section and a second mesial section, and the second surface engager includes a notch or material weakness between the second distal section and the second mesial section.

In one version of the separator device, the first distal section of the first surface engager includes a notch between the first portion and the second portion, and the notch between the first portion and the second portion opens toward gingival when the separator device is positioned to separate the teeth.

In another version of the separator device, the first mesial section includes a third portion, a fourth portion, and a notch or material weakness between the third portion and the fourth portion.

In another version of the separator device, the second distal section includes a fifth portion, a sixth portion, and a notch or material weakness between the fifth portion and the sixth portion.

In another version of the separator device, the second distal section of the second surface engager includes a notch between the fifth portion and the sixth portion, and the notch between the fifth portion and the sixth portion opens toward gingival when the separator device is positioned to separate the teeth.

In another version of the separator device, the second mesial section includes a seventh portion, an eighth portion, and a notch or material weakness between the seventh portion and the eighth portion.

In another version of the separator device, the body has three reference axes defined in relation to the body, a first reference axis of the three reference axes defined by a front to rear reference line of the body, a second reference axis of the three reference axes defined by a side to side reference line of the body, and a third reference axis of the three reference axes defined by a top to bottom reference line of the body, and the notch or material weakness between the first distal section and the first mesial section and the notch or material weakness between the first portion and the second portion allows motion of the first portion and the second portion in all three axes.

In another version of the separator device, the notch between the first portion and the second portion faces toward gingival when the separator device is positioned to separate the teeth.

In another version of the separator device, the body has three reference axes defined in relation to the body, a first reference axis of the three reference axes defined by a front to rear reference line of the body, a second reference axis of the three reference axes defined by a side to side reference line of the body, and a third reference axis of the three reference axes defined by a top to bottom reference line of the body, and the notch or material weakness between the first distal section and the first mesial section and the notch or material weakness between the third portion and the fourth portion allows motion of the third portion and the fourth portion in all three axes.

In another version of the separator device, the notch between the third portion and the fourth portion faces toward gingival when the separator device is positioned to separate the teeth.

In another version of the separator device, the body has three reference axes defined in relation to the body, a first reference axis of the three reference axes defined by a front to rear reference line of the body, a second reference axis of the three reference axes defined by a side to side reference line of the body, and a third reference axis of the three reference axes defined by a top to bottom reference line of the body, and the notch or material weakness between the second distal section and the second mesial section and the notch or material weakness between the fifth portion and the sixth portion allows motion of the fifth portion and the sixth portion in all three axes.

In another version of the separator device, the notch between the fifth portion and the sixth portion faces toward gingival when the separator device is positioned to separate the teeth.

In another version of the separator device, the body has three reference axes defined in relation to the body, a first reference axis of the three reference axes defined by a front to rear reference line of the body, a second reference axis of the three reference axes defined by a side to side reference line of the body, and a third reference axis of the three reference axes defined by a top to bottom reference line of the body, and the notch or material weakness between the second distal section and the second mesial section and the notch or material weakness between the seventh portion and the eighth portion allows motion of the seventh portion and the eighth portion in all three axes.

In another version of the separator device, the notch between the seventh portion and the eighth portion faces toward gingival when the separator device is positioned to separate the teeth.

In another version of the separator device, the first surface engager includes a notch between the first distal section and the first mesial section, and the notch between the first distal section and the first mesial section opens toward gingival when the separator device is positioned to separate the teeth.

In another version of the separator device, the second surface engager includes a notch between the second distal section and the second mesial section, and the notch between the second distal section and the second mesial section opens toward gingival when the separator device is positioned to separate the teeth.

In another version of the separator device, the notch between the first distal section and the first mesial section extends from a first side of the first surface engager to an opposite second side of the first surface engager, and the notch between the second distal section and the second mesial section extends from a first side of the second surface engager to an opposite second side of the second surface engager.

In another version of the separator device, the separator device further comprises: a second elastic body having a first end and an opposed second end spaced from the first end of the second elastic body, wherein the first surface engager is connected to the first end of the second elastic body, and wherein the second surface engager is connected to the second end of the second elastic body.

In another version of the separator device, the first surface engager comprises a first overmold of resin over the elastic body and the second elastic body, and the second surface engager comprises a second overmold of resin over the elastic body and the second elastic body.

In another version of the separator device, the elastic body is arcuate, and the second elastic body is arcuate. The elastic body and the second elastic body can be concentric.

In another aspect, the invention provides a separator device for separating teeth and/or for creating adaptation pressure on an interproximal dental matrix stabilizer and/or a dental matrix. The separator device comprises: a first elastic body having a first end and an opposed second end spaced from the first end of the first elastic body; a second elastic body having a first end and an opposed second end spaced from the first end of the second elastic body; a first surface engager connected to the first end of the first elastic body and to the first end of the second elastic body; and a second surface engager connected to the second end of the first elastic body and to the second end of the second elastic body.

In one version of the separator device, the first surface engager comprises a first overmold of resin over the first elastic body and the second elastic body, and the second surface engager comprises a second overmold of resin over the first elastic body and the second elastic body.

The first elastic body can be arcuate, and the second elastic body can be arcuate. The first elastic body and the second elastic body can be concentric. The first elastic body can comprise a nickel titanium alloy, and the second elastic body can comprise a nickel titanium alloy.

In another version of the separator device, the first surface engager includes a first distal section and a first mesial section, and a notch between the first distal section and the first mesial section; and the second surface engager includes a second distal section and a second mesial section, and a notch between the second distal section and the second mesial section.

In another version of the separator device, the first distal section includes a first portion, a second portion, and a notch between the first portion and the second portion, the first mesial section includes a third portion, a fourth portion, and a notch between the third portion and the fourth portion, the second distal section includes a fifth portion, a sixth portion, and a notch between the fifth portion and the sixth portion, and the second mesial section includes a seventh portion, an eighth portion, and a notch between the seventh portion and the eighth portion.

In another version of the separator device, the notch between the first distal section and the first mesial section extends from a first side of the first surface engager to an opposite second side of the first surface engager, and the notch between the second distal section and the second mesial section extends from a first side of the second surface engager to an opposite second side of the second surface engager.

In another version of the separator device, the first side of the first surface engager faces away from gingival when the separator device is positioned to separate the teeth, and the first side of the second surface engager faces away from gingival when the separator device is positioned to separate the teeth.

In another version of the separator device, the first side of the first surface engager is spaced in a direction away from gingival from occlusal surfaces of teeth when the separator device is positioned to separate the teeth, and the first side of the second surface engager is spaced in the direction away from gingival from occlusal surfaces of the teeth when the separator device is positioned to separate the teeth.

In another version of the separator device, the first surface engager includes a first concavity, the second surface engager includes a second concavity, the first concavity and second concavity are in facing relationship, and the first concavity and second concavity are dimensioned to engage a separator forceps for outwardly moving the first elastic body and the second elastic body. The first concavity and the second concavity may each extend a distance away from occlusal surfaces of the teeth in the direction away from gingival when the separator device is positioned to separate the teeth.

Therefore, it is an advantage of the invention to provide an improved dental separator device for separating teeth and/or for creating adaptation pressure on an interproximal dental matrix stabilizer and/or a dental matrix.

It is another advantage of the invention to provide an improved dental separator device that includes four pairs of independently flexing hands. The independent adapting areas allow control of flow and endpoint of restoration composite placement to eliminate excesses (overhangs) in the same manner as a dental wedge, specifically at line angle areas at the gingival corners of the restorations where overhangs are common and extremely difficult to remove because of poor access and poor visualization.

It is another advantage of the invention to provide an improved dental separator device with one or more arcuate spring sections that can be part of a one piece assembly or a three or more piece assembly comprising an overmold of resin over metallic springs or a snap together assembly. The springs may be plastic or metal or any other resilient material.

It is another advantage of the invention to provide an improved dental separator device for separating teeth and/or for creating adaptation pressure on an interproximal dental matrix stabilizer and/or a dental matrix wherein the dental separator device includes one or more pairs of hands that serve to separate adjacent teeth and/or create adaptation pressure on an interproximal dental matrix stabilizer and/or a dental matrix. A notch or material weakness between each pair of hands allows for independent flexing of the hands.

It is another advantage of the invention to provide an improved dental separator device for separating teeth and/or for creating adaptation pressure on an interproximal dental matrix stabilizer and/or a dental matrix wherein the dental separator device includes one or more pair of hands that serve to separate adjacent teeth and/or create adaptation pressure on an interproximal dental matrix stabilizer and/or a dental matrix. A notch or material weakness at the engaging part of each hand where the hand engages the gumline part of the tooth allows further flexing and adaptation to the teeth and/or interproximal dental matrix stabilizer and/or a dental matrix.

These and other features, aspects, and advantages of the present invention will become better understood upon consideration of the following detailed description, drawings, and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Figure 1:
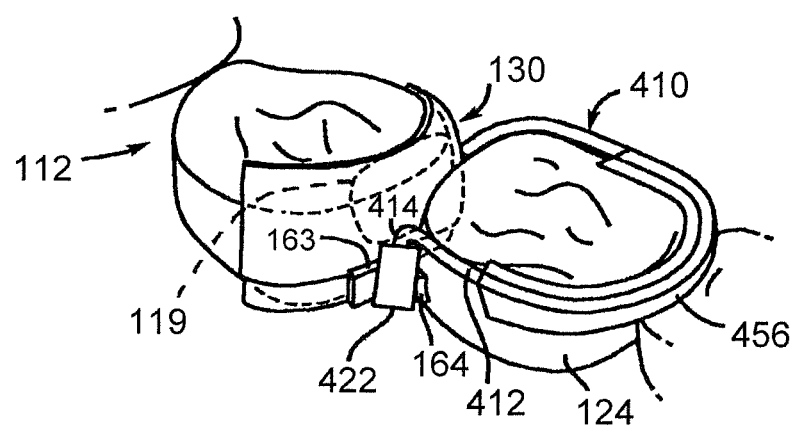
FIG. 1 is a top perspective view of a prior art dental separator ring.

In order to provide context for the present invention, FIG. 1 shows the use of a prior art dental separator ring 410. After creation of a cavity preparation 119 in the tooth 112 of FIG. 1, a sectional anatomic translucent dental matrix 130 is inserted between the tooth 112 and the tooth 124 as shown in FIG. 1. The dental matrix 130 is placed around the tooth 112 maintaining anatomic root adaptation contact using an interproximal dental matrix stabilizer having separate end members 163, 164. A dental separator ring 410 is then placed in the interproximal embrasure to create slight tooth separation and additional adaptation pressure on the separate end members 163, 164 of the interproximal dental matrix stabilizer and/or the dental matrix 130. The separator ring 410 has an arcuate body 412 having a first leg 414 and a second leg (not shown) that extend at a generally right angle from the body 412. The separator ring 410 has a clamp 422 mounted on the end of the leg 414, and a similar clamp (not shown) mounted on the end of the other leg (not shown). The separator ring 410 also has an arcuate cover 456. The clamp 422 of the separator ring 410 can be placed between the separate end members 163, 164 of the dental matrix stabilizer when the separator ring 410 is placed on the dental matrix stabilizer. The other clamp (not shown) of the separator ring 410 can also be placed between the opposite side end members of the dental matrix stabilizer in a similar fashion. The separator ring 410 can be used to separate teeth 112, 124 (when a matrix and matrix stabilizer are not used), or to create adaptation pressure on a matrix (when a matrix stabilizer is not used), or to create adaptation pressure on an interproximal dental matrix stabilizer and dental matrix (when a matrix and a matrix stabilizer are both used as in FIG. 1).

Figure 2:
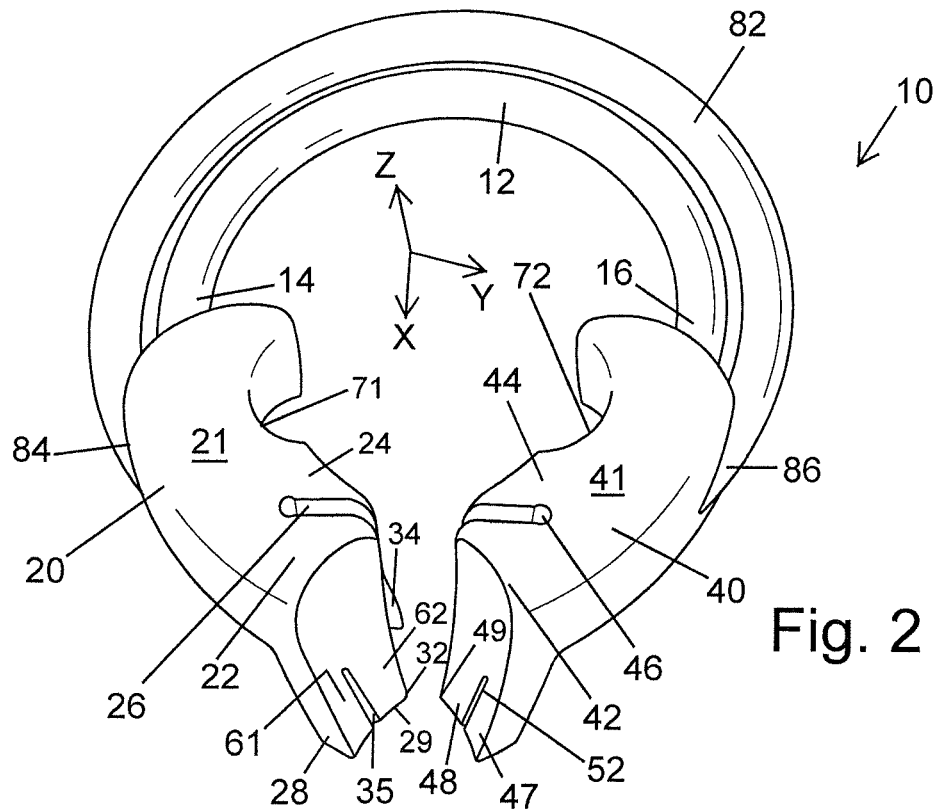
FIG. 2 is top perspective view of an example embodiment of a dental separator device according to the invention.
Figure 3:
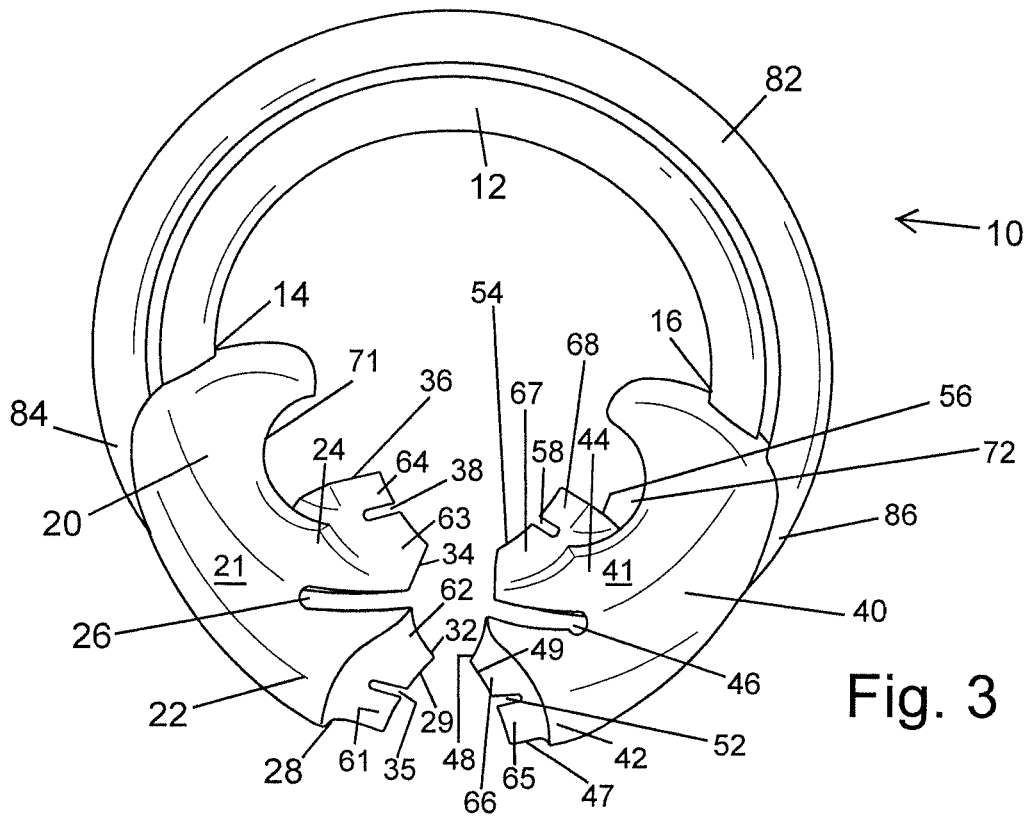
FIG. 3 is a top plan view of the separator device of FIG. 2.
Figure 4:
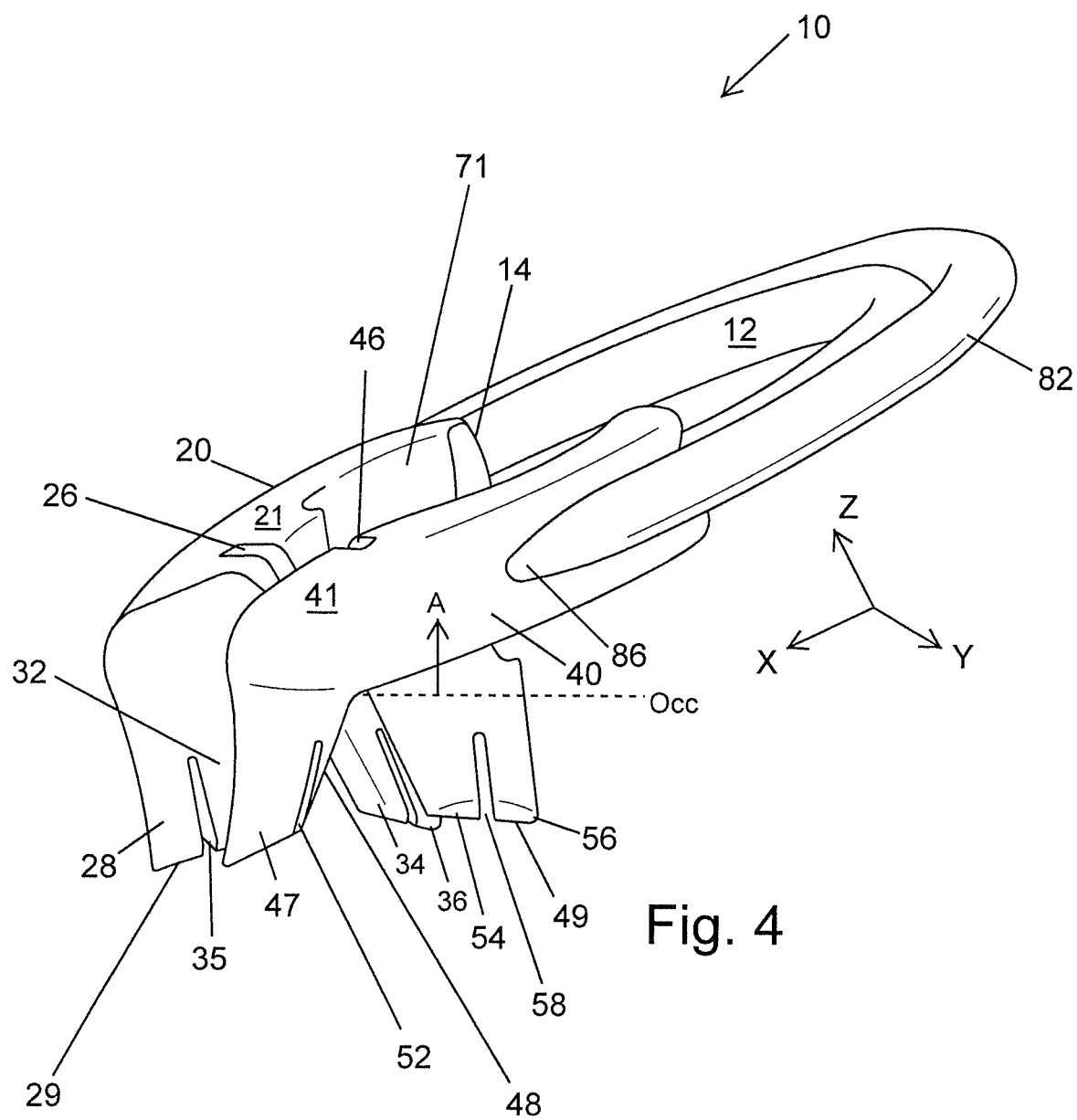
FIG. 4 is a side perspective view of the separator device of FIG. 2.

Turning now to FIGS. 2, 3 and 4, there is shown a non-limiting example embodiment of a dental separator device 10 according to the invention for separating teeth and/or for creating adaptation pressure on an interproximal dental matrix stabilizer and/or a dental matrix. The separator device 10 comprises an elastic spring body 12 having a first end 14 and an opposed second end 16 spaced from the first end 14. The spring body 12 is arcuate, and is circular in a transverse cross-sectional view.

The separator device 10 further comprises a first surface engager 20 connected to the first end 14 of the body 12 wherein the first surface engager 20 includes a first distal section 22 and a first mesial section 24. The first surface engager 20 includes a notch 26 between the first distal section 22 and the first mesial section 24. The notch 26 extends from a first side 21 of the first surface engager 20 to an opposite second side 29 of the first surface engager 20. The first side 21 of the first surface engager 20 faces away from gingival when the separator device 10 is positioned on adjacent teeth, and the second side 29 of the first surface engager 20 faces toward gingival when the separator device 10 is positioned on adjacent teeth. The first distal section 22 includes a first portion (e.g., hand) 28, a second portion (e.g., hand) 32, and a notch 35 between the first portion 28 and the second portion 32. The first mesial section 24 includes a third portion (e.g., hand) 34, a fourth portion (e.g., hand) 36, and a notch 38 between the third portion 34 and the fourth portion 36. Alternatively, one, two or three of notches 26, 35, 38 can be replaced with a section of material weakness, such as a thinned or perforated region of the material comprising the first surface engager 20.

The separator device 10 further comprises a second surface engager 40 connected to the second end 16 of the body 12. The second surface engager 40 includes a second distal section 42 and a second mesial section 44. The second surface engager 40 including a notch 46 between the second distal section 42 and the second mesial section 44. The notch 46 extends from a first side 41 of the second surface engager 40 to an opposite second side 49 of the second surface engager 40. The first side 41 of the second surface engager 40 faces away from gingival when the separator device 10 is positioned on adjacent teeth, and the second side 49 of the second surface engager 40 faces toward gingival when the separator device 10 is positioned on adjacent teeth. The second distal section 42 includes a fifth portion (e.g., hand) 47, a sixth portion (e.g., hand) 48, and a notch 52 between the fifth portion 47 and the sixth portion 48. The second mesial section 44 includes a seventh portion (e.g., hand) 54, an eighth portion (e.g., hand) 56, and a notch 58 between the seventh portion 54 and the eighth portion 56. Alternatively, one, two or three of notches 46, 52, 58 can be replaced with a section of material weakness, such as a thinned or perforated region of the material comprising the second surface engager 40.

The spring body 12 has three reference axes defined in relation to the body 12. A first reference axis of the three reference axes is defined by a front to rear reference line (X of FIGS. 2 and 4) of the body 12. A second reference axis of the three reference axes defined by a side to side reference line (Y of FIGS. 2 and 4) of the body 12. A third reference axis of the three reference axes defined by a top to bottom reference line (Z of FIGS. 2 and 4) of the body 12.

The first portion 28, the second portion 32, the third portion 34, the fourth portion 36, the fifth portion 47, the sixth portion 48, the seventh portion 54 and the eighth portion 56 are dimensioned to separate teeth and/or create adaptation pressure on an interproximal dental matrix stabilizer and/or a dental matrix. The first portion 28, the second portion 32, the third portion 34, the fourth portion 36, the fifth portion 47, the sixth portion 48, the seventh portion 54 and the eighth portion 56 have a high flexibility that allows them to engage, for example: (i) four surfaces on two adjacent teeth, or (ii) the surface of a dental matrix on one tooth and two surfaces on an adjacent tooth, or (iii) the surface of one dental matrix on one tooth and the surface of another dental matrix on an adjacent tooth, or (iv) the surface of an interproximal dental matrix stabilizer on one or both adjacent teeth. It can be appreciated that the surfaces engaged by the first portion 28, the second portion 32, the third portion 34, the fourth portion 36, the fifth portion 47, the sixth portion 48, the seventh portion 54 and the eighth portion 56 can be any combination of tooth surfaces and/or matrix surfaces and/or interproximal dental matrix stabilizer surfaces. One problem with prior dental separator rings is that the low flexibility on the tooth engaging elements does not allow the ring to engage all tooth surfaces when the ring is used between bicuspids and molars. The separator device 10 of the present invention solves this problem with prior separator rings by way of the first portion 28, the second portion 32, the third portion 34, the fourth portion 36, the fifth portion 47, the sixth portion 48, the seventh portion 54 and the eighth portion 56 of the separator device 10.

The notch 26 (or material weakness) between the first distal section 22 and the first mesial section 24, the notch 34 (or material weakness) between the first portion 28 and the second portion 32, the notch 38 (or material weakness) between the third portion 34 and the fourth portion 36, the notch 46 (or material weakness) between the second distal section 42 and the second mesial section 44, the notch 52 (or material weakness) between the fifth portion 47 and the sixth portion 48, and the notch 58 (or material weakness) between the seventh portion 54 and the eighth portion 56 allows the first portion 28, the second portion 32, the third portion 34, the fourth portion 36, the fifth portion 47, the sixth portion 48, the seventh portion 54 and the eighth portion 56 to adapt to a variety of tooth shapes and tooth alignments.

The first portion 28, the second portion 32, the third portion 34, the fourth portion 36, the fifth portion 47, the sixth portion 48, the seventh portion 54 and the eighth portion 56 may include concave surfaces 61, 62, 63, 64, 65, 66, 67, respectively, for engaging a tooth and/or a matrix, and/or a matrix stabilizer.

The first portion 28, the second portion 32, the third portion 34, the fourth portion 36, the fifth portion 47, the sixth portion 48, the seventh portion 54 and the eighth portion 56 may be designed to also interface with a dental wedge (such as that shown in U.S. Patent Application Publication No. 2011/0171596 or PCT International Publication No. WO 2015/187927) to create a continuous seal from wedge pressure to ring pressure. Previous separators either had a simple point contact or a broader but more coronal contact that did not specifically focus on preventing surplus composite from flowing past the line angle margins leading to overhangs and leaking areas where the excess composite is not properly bonded to the tooth.

The dental separator device 10 can be placed with a traditional separator forceps or a rubber dam forceps using first concavity 71 in the first surface engager 20 and second concavity 72 in the second surface engager 40. The first concavity 71 extends from the first side 21 of the first surface engager 20 to the opposite second side 29 of the first surface engager 20. The second concavity 72 extends from the first side 41 of the second surface engager 40 to the opposite second side 49 of the second surface engager 40.

Looking at FIG. 4, the first side 21 of the first surface engager 20 is spaced in a direction A away from gingival from occlusal surfaces (illustrated as dashed line Occ in FIG. 4) when the separator device 10 is positioned to separate the teeth. Likewise the first side 41 of the second surface engager 40 is spaced in the direction A away from gingival from occlusal surfaces of the teeth when the separator device 10 is positioned to separate the teeth. Also, the first concavity 71 and the second concavity 72 each extend a distance away from occlusal surfaces Occ of the teeth in the direction A away from gingival when the separator device is positioned to separate the teeth. For example, when the separator device 10 is positioned on adjacent lower molars, the first side 21 of the first surface engager 20 and the first side 41 of the second surface engager 40 are located above occlusal surfaces of the adjacent molars and the first concavity 71 and the second concavity 72 extend above occlusal surfaces of the adjacent molars.

The first surface engager 20 and the second surface engager 40 can be translucent or transparent (clear) allowing for light transmission during curing of a light-cured dental composite filling material. The body 12 can comprise an opaque, translucent or transparent polymeric material, or a spring metal or metallic alloy. The dental separator device 10 may include a second body 82 comprising an opaque, translucent or transparent polymeric material, or a spring metal or metallic alloy. The first surface engager 20 is connected to the first end 84 of the second body 82. The second surface engager 40 is connected to the second end 86 of the body 82. The spring body 82 is arcuate, and is circular in a transverse cross-sectional view.

The dental separator device 10 can be manufactured as an over-molded part, e.g., the polymeric resin forming the first surface engager 20 and the second surface engager 40 is molded over metal rings 12 and 82, which can comprise a metallic elastic material such as superelastic nickel titanium alloy (e.g., Nitinol) or carbon spring steel or stainless steel. Alternatively, the first surface engager 20 and the second surface engager 40 can be snapped on the metal rings 12 and 82. The polymeric resin forming the first surface engager 20 and the second surface engager 40 may be selected from polyolefins, such as polyethylene or polypropylene, or urethanes, or polyesters or silicones, or polyamides.

Thus, the invention provides an improved separator device for separating teeth and/or for creating adaptation pressure on an interproximal dental matrix stabilizer and/or a dental matrix. The separator device can be used with any matrix, and has a unique design that allows the separator device to adapt and adhere to a variety of tooth types and shapes. The dental separator device has a geometry that causes it to apply a strong even tension that assists in the separation of the teeth, and creates a strong seal with the matrix, and does not allow dental restorative material (e.g., composite) to flow past the gingival margin thus eliminating line angle overhangs. The dental separator device has a structural design that causes the separator device to have excellent form memory, i.e., the separator device retains its original shape without warping, even after hundreds of uses. In one version of the separator device, the separator device becomes easier to squeeze the forceps due to the physics of twin Nitinol wires which dictate how the user spreads the device open. The dental separator device helps to eliminate interference when a clamp is used due to the angle of the spring.

In the separator device, the independently flexing hands adapt to accommodate for a wide variety of tooth shapes. The wide undercutting hands ensure stability and eliminate flash and prevent slip-off. In one version of the separator device, a unique twin Nitinol wire design allows for very strong separation without the hand strain of opening prior stainless steel rings.

Although the invention has been described with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A separator device for separating teeth and/or for creating adaptation pressure on an interproximal dental matrix stabilizer and/or a dental matrix, the separator device comprising:
a first elastic body having a first end and an opposed second end spaced from the first end of the first elastic body;
a second elastic body having a first end and an opposed second end spaced from the first end of the second elastic body;
a first surface engager connected to the first end of the first elastic body and to the first end of the second elastic body; and
a second surface engager connected to the second end of the first elastic body and to the second end of the second elastic body,
wherein the first surface engager includes a first distal section and a first mesial section, and a notch between the first distal section and the first mesial section,
wherein the second surface engager includes a second distal section and a second mesial section, and a notch between the second distal section and the second mesial section,
wherein the first distal section includes a first portion, a second portion, and a notch between the first portion and the second portion,
wherein the first mesial section includes a third portion, a fourth portion, and a notch between the third portion and the fourth portion, wherein the second distal section includes a fifth portion, a sixth portion, and a notch between the fifth portion and the sixth portion, wherein the second mesial section includes a seventh portion, an eighth portion, and a notch between the seventh portion and the eighth portion, and wherein the notch between the first portion and the second portion faces toward gingival when the separator device is positioned to separate the teeth, wherein the notch between the first distal section and the first mesial section extends from a first side of the first surface engager to an opposite second side of the first surface engager, and wherein the first side of the first surface engager faces away from gingival when the separator device is positioned to separate the teeth.

2. The separator device of claim 1 wherein:

the first surface engager comprises a first overmold of resin over the first elastic body and the second elastic body, and the second surface engager comprises a second overmold of resin over the first elastic body and the second elastic body.

3. The separator device of claim 1 wherein:
the first elastic body is arcuate, and
the second elastic body is arcuate.

4. The separator device of claim 3 wherein:
the first elastic body and the second elastic body are concentric.

5. The separator device of claim 1 wherein:
the first elastic body comprises a nickel titanium alloy, and
the second elastic body comprises a nickel titanium alloy.

6. The separator device of claim 1 wherein:
the notch between the second distal section and the second mesial section extends from a first side of the second surface engager to an opposite second side of the second surface engager.

7. The separator device of claim 6 wherein:
the first side of the second surface engager faces away from gingival when the separator device is positioned to separate the teeth.

8. The separator device of claim 6 wherein:
the first side of the first surface engager is spaced in a direction away from gingival from occlusal surfaces of teeth when the separator device is positioned to separate the teeth, and the first side of the second surface engager is spaced in the direction away from gingival from occlusal surfaces of the teeth when the separator device is positioned to separate the teeth.

9. The separator device of claim 6 wherein:
the first surface engager includes a first concavity,
the second surface engager includes a second concavity,
the first concavity and second concavity are in facing relationship, and
the first concavity and second concavity are dimensioned to engage a separator forceps for outwardly moving the first elastic body and the second elastic body.

10. The separator device of claim 9 wherein:
the first concavity and the second concavity each extend a distance away from occlusal surfaces of the teeth in the direction away from gingival when the separator device is positioned to separate the teeth.

11. The separator device of claim 1 wherein:
the first elastic body is circular in a transverse cross-sectional view, and
the second elastic body is circular in a transverse cross-sectional view.

12. The separator device of claim 1 wherein:
the notch between the third portion and the fourth portion faces toward gingival when the separator device is positioned to separate the teeth.

13. The separator device of claim 1 wherein:
the notch between the fifth portion and the sixth portion faces toward gingival when the separator device is positioned to separate the teeth.

14. The separator device of claim 1 wherein:
the notch between the seventh portion and the eighth portion faces toward gingival when the separator device is positioned to separate the teeth.

* * * * *